United States Patent
Miller et al.

(10) Patent No.: US 7,638,064 B1
(45) Date of Patent: Dec. 29, 2009

(54) METHOD AND SYSTEM FOR DISINFECTING IRRIGATION WATER IN AGRICULTURAL IRRIGATION SYSTEMS

(76) Inventors: John C. Miller, 2274 W. Dovewood La., Fresno, CA (US) 93711; Deborah L. Miller, 2274 W. Dovewood La., Fresno, CA (US) 93711

( * ) Notice: Subject to any disclaimer, the term of this patent is extended or adjusted under 35 U.S.C. 154(b) by 232 days.

(21) Appl. No.: 11/901,683

(22) Filed: Sep. 18, 2007

(51) Int. Cl.
*C02F 1/76* (2006.01)

(52) U.S. Cl. .................. 210/739; 210/747; 210/754; 210/764

(58) Field of Classification Search .................. 210/756, 210/746, 739, 745, 754, 764, 747, 96.1; 700/284; 405/36, 37; 137/2
See application file for complete search history.

(56) References Cited

U.S. PATENT DOCUMENTS 6,238,573 B1    5/2001    Miller et al.

OTHER PUBLICATIONS

"ASAE EP405.1 Standard: Design and Installation of Microirrigation Systems", Feb. 2003, American Society of Agricultural Engineers.*

"Forms of Chlorine in Water", Revised Nov. 2003, Edstrom Industries, Waterford Wisconsin.*

"Schematic of a Typical Microirrigation System", Oklahoma State University CIS-LABS.*

* cited by examiner

*Primary Examiner*—Matthew O Savage
*Assistant Examiner*—Paul J Durand
(74) *Attorney, Agent, or Firm*—The Law Office of Joan I. Norek; Joan I. Norek

(57) ABSTRACT

A method for disinfecting agricultural irrigation water system-wide comprises (a) continuously feeding chlorine to the irrigation system and (b) monitoring an outer field point to determine whether at least a detectable level of residual chlorine is seen at that point, whereby chlorination disinfection system-wide is achieved. An enhanced irrigation system which is adapted for disinfecting agricultural irrigation water system-wide includes (a) apparatus for continuously feeding chlorine to the irrigation system and (b) apparatus for monitoring residual chlorine at an outer field point (to determine whether at least a detectable level of residual chlorine is seen at that point) for the purpose of achieving chlorination disinfection system-wide.

5 Claims, 3 Drawing Sheets

METHOD AND SYSTEM FOR DISINFECTING IRRIGATION WATER IN AGRICULTURAL IRRIGATION SYSTEMS

BACKGROUND OF THE INVENTION

The present invention relates to methods and systems for controlling contamination from microorganisms in agricultural irrigation systems.

The addition of chlorine or chlorine compounds to water has been used for over a century to purify water. Chlorine purifies water by killing or inactivating microorganisms in the water. There are numerous types of microorganisms. The most common classes of microorganisms found in typical water sources utilized for agricultural irrigation are bacteria, viruses, and protozoa, which include coliforms and biofilms. Coliform is a group of microorganisms or bacteria whose presence in water is a common indicator of fecal pollution and potentially dangerous disease-causing (pathogenic) microorganisms. Coliform bateria include *Escherichia coli* (*E. coli*) which has been the culprit of multiple prior and current food recalls and outbreaks. Microbial biofilms are populations of organisms, typically surrounded by an extracellular, polymeric slime layer, which accumulate on surfaces in an aqueous environment. Biofilms are composed of microorganisms such as bacteria, protozoa, algae and invertebrate animals.

The mode of interaction between the microorganism and the chlorine normally is different for each class. Chlorine disinfects water, eliminating microorganism contamination, by several mechanisms. It destroys bacteria by penetration of the cell wall, killing the organism. It disinfects viruses by inactivation, rendering the organism incapable of reproduction. It disinfects *giardia* (a genus of protozoa which infect the gastrointestinal tract of humans when ingested) by inactivation. In other words, in the case of bacteria, the chlorine penetrates the cell wall and kills the organism. For viruses and protozoa, chlorine inactivates the organisms by rendering them incapable of reproduction.

Recommended uses of chlorine in agricultural water treatment include the removal of bacteria and algae (disinfection), the prevention of regrowth of algae and bacteria in the agricultural water distribution system (disinfection) and the oxidation of iron and manganese in tanks or reservoirs prior to filtration. Interference with the disinfection chlorination process is spawned by turbidity, the presence of excess chlorine-demanding inorganic compounds (e.g. iron, manganese) and high pH.

The primary sources of chlorine are chlorine gas, calcium hypochlorite and sodium hypochlorite. Chlorine gas is very effective (100% available chlorine), inexpensive and very dangerous. Chlorine gas was the first gas used in chemical warfare. Due to safety concerns, the use of chlorine gas for agricultural chlorination is prohibited in many regions of California and presumably elsewhere. Sodium hypochlorite is available as an easy to use liquid which has a low percentage of chlorine (6 to 12.5% available chlorine). Excess sodium can, however, be detrimental to plants, and sodium hypochlorite solution is corrosive and its high water content leads to high freight costs. Calcium hypochlorite is available as a solid which has a high level of chlorine (67% available chlorine). As a solid, calcium hypochlorite is very difficult to use in a pressurized system and the presence of calcium can cause plugging in drip irrigation systems using alkaline water.

Although chlorine and its related compounds are routinely used for controlling microorganisms in water systems, there has been no accurate and economical method for controlling chlorine in systems that are used for irrigation of agricultural crops. The farmer or grower conventionally attempts microorganism control by adding a "slug feed" of bleach or copper sulfate (a non-oxidizing algaecide/biocide) to the water of an irrigation system with little or no knowledge of the resultant additive concentration in the system or the abundance of the microorganism to be killed or controlled. Although the goal of controlling the microbiological organisms in the irrigation water system is correct, the slug-feed approach is normally inadequate. Excess chlorination is undesirable because excess available chlorine in the irrigation water can adversely affect (kill) probiotics which are naturally-occurring in, or are added by the grower to, the soil. Additionally, minimizing chlorination prevents build-up of chloride concentrations in the soil. These chlorides can be toxic to sensitive crops, and can result in undesirable decreases in crop yield or quality.

The deficiencies in the control of microorganisms in agricultural production have spawned repeated, and now well-publicized, out-breaks of food contaminations and recalls in the U.S. Crops such as spinach and lettuce have been determined to have been contaminated by *E. coli* during in-field production (rather than post-harvest handling). Such *E. coli* contaminations have caused severe illness and even death. One of the prime suspects of in-field crop contamination is contaminated irrigation water, which highlights a serious need to improve the conventional approaches to microorganism control in irrigation water It is an object of the invention to provide a method and a system for accurately and economically delivering chlorine, or compounds that liberate chlorine, into an irrigation system for controlling the growth of microorganisms and for disinfecting the irrigation water.

SUMMARY OF THE INVENTION

The present invention provides a method for disinfecting agricultural irrigation water system-wide in which (a) chlorine is continuously fed to the irrigation system and (b) an outer field point is monitored to determine whether at least a detectable level of residual chlorine is seen at that point, whereby chlorination disinfection system-wide is achieved. The present invention provides an enhanced irrigation system adapted for disinfecting agricultural irrigation water system-wide in which (a) apparatus for continuously feeding chlorine to the irrigation system and (b) apparatus for monitoring residual chlorine at an outer field point (to determine whether at least a detectable level of residual chlorine is seen at that point) are provided for the purpose of achieving chlorination disinfection system-wide.

DETAILED DESCRIPTION OF THE INVENTION

Figure 1:
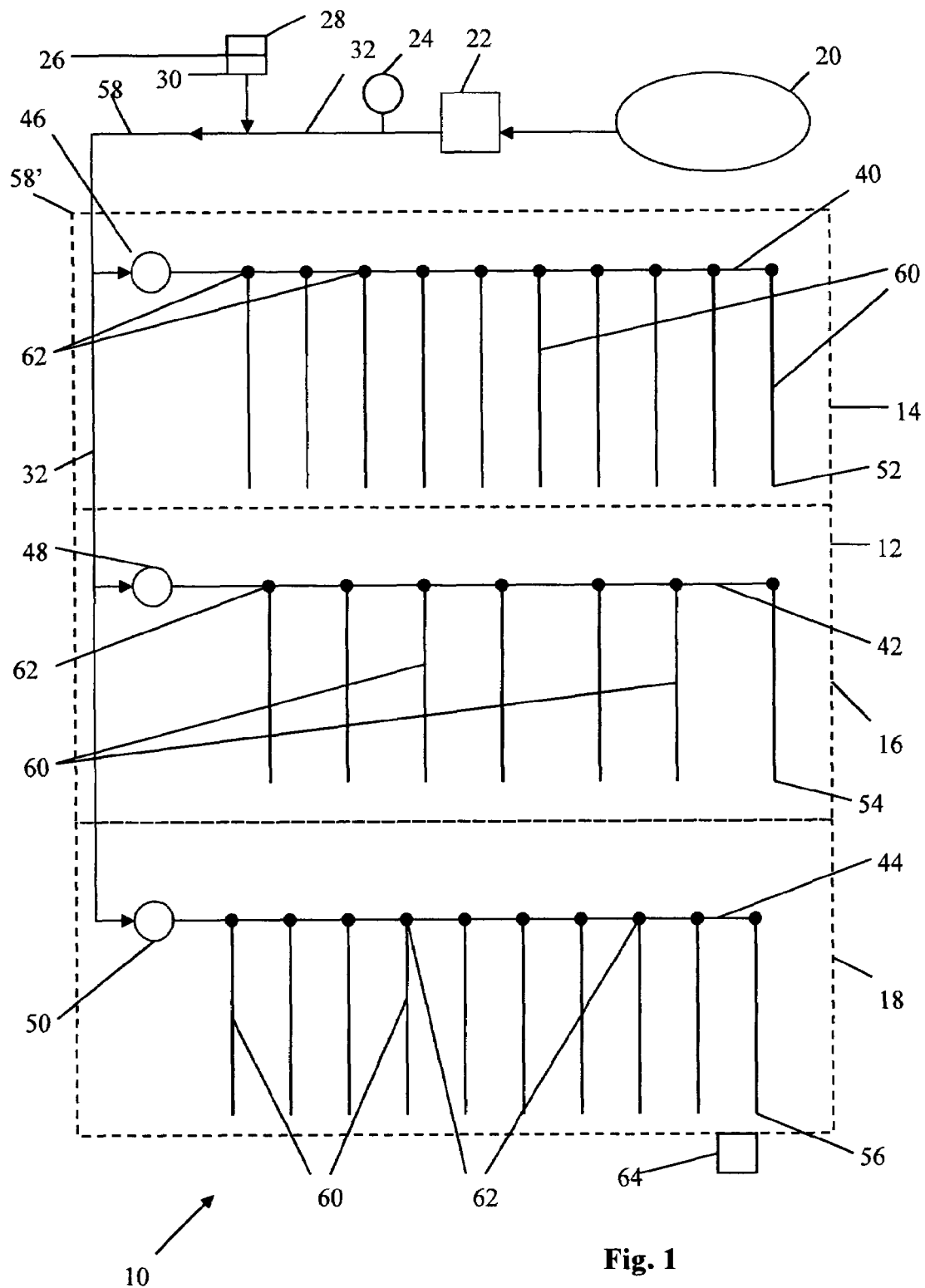
FIG. 1 is a schematic drawing of an irrigation system of the present invention.

The present invention provides an accurate, reliable and economical method that at least reduces, and normally eliminates, microbiological contamination of agricultural crops from contaminants in the irrigation water source by means of disinfection and/or sanitation of the irrigation water, and a system in which the method is run.

The present invention provides a method for disinfecting irrigation water system-wide in an agricultural irrigation system for an agricultural-production field to prevent agricultural product contamination, preferably without excessive chlorine expenditure, the irrigation system having a point of entry to the field, comprising the steps of: (1) determining a target outer point of the irrigation system (pipeline network) ("outer field point"), which preferably is the farthest from the point of entry of water to the field ("farthest field point"), and which usually (but not invariably) is the most remote longitudinal point ("outermost field point"); (2) preferably determining the chlorine demand of the irrigation water at or ahead of the point of entry of the water to the field; (3) providing a chlorine source at or ahead of the point of entry of the water to the field; (4) providing a variable chlorine delivery system for feeding the chlorine source to the water at or ahead of the point of entry of the water to the field; (5) selecting a target chlorine residual at the outer point in the field (which chlorine residual target might be a free chlorine residual target, a total chlorine residual target or both) which preferably is combined with the chlorine demand to provide a target chlorine feed level; (6) preferably calibrating the chlorine delivery system based on the target chlorine feed level and the rate of flow of the water through the point of entry; (7) activating the chlorine delivery system whereby the target level of chlorine (target chlorine feed level) is continuously fed to the irrigation water at or ahead of the point of entry to the field; (8) after activating the chlorine delivery system, monitoring the level of chlorine residual at the outer (preferably farthest) field point; and (9) if the chlorine residual at the outer field point does not meet the target chlorine residual or sufficiently approximate the target chlorine residual, regulating or adjusting the chlorine delivery system to realize (reach) the target chlorine residual at the outer field point.

The point of entry of the irrigation system (point of entry of the irrigation water) to the field, as that term is used herein, is the point along the pipeline at which the first branching off the mainline occurs, or any point along the mainline which is upstream of such first branching point and downstream of, or at, the chlorine feed site. The latter points are functionally equivalent to the first branching point for the purposes of the present invention.

By the term chlorine residual(s) is broadly meant herein the concentration of chlorine in any form that supplies to some degree available chlorine (available for active chlorination), regardless of the chlorine form(s) or analytical method(s) used to determine it/them. The current conventional analysis techniques suitable for use in the field are those used to measure free chlorine and total chlorine (described further below). Therefore, these chlorine residual forms are used in the Examples below, and are frequently referenced below. Nonetheless, as noted above, the term chlorine residual(s) as used herein means the concentration of chlorine in any form that supplies to some degree available chlorine (available for active chlorination), unless a specific chlorine residual form is expressly indicated. The term chlorine residual therefore broadly encompasses free chlorine, total chlorine, combinations and accumulations of both, and the like.

The present invention also provides an enhanced irrigation system, designed for disinfecting irrigation water system-wide in an irrigation pipeline network used for an agricultural-production field, to prevent agricultural product contamination from the irrigation water without excessive chlorine expenditure, comprising: (a) a source of irrigation water; (b) an agricultural field, which usually (but not invariably) is a multi-block field; (c) an agricultural irrigation pipeline network comprising a first main line, at least a first lateral line branching off the main line, a plurality of irrigation-water-delivery points along the first lateral line or along one or more irrigation lines branching off the first lateral line, a point of irrigation water entry to the pipeline network, a point along the pipeline network of irrigation water entry to the field, and an outer point along the pipeline network which preferably is the farthest from the point of irrigation water entry to the field (farthest field point); (d) sometimes a filtration system, (e) sometimes a water flow line between the source of irrigation water and the point of irrigation water entry to the pipeline network; (f) a chlorine source; (g) a control system adapted for continuous feeding of chlorine from the chlorine source at a predetermined level to the irrigation water in the pipeline network at or upstream of the first lateral line; and (h) a first analytical station, preferably a mobile analytical station, adapted for determining the level of residual chlorine (such as free chlorine and/or total chlorine) in the irrigation water at the outer (preferably farthest) field point.

In bringing about the disinfection and/or sanitation of the irrigation water for the purpose of providing biologically-safe water for the irrigation of the crop of interest, the present invention impacts the irrigation water and the in-place irrigation system in a very controlled way, without doing too little or too much. In its simplest form, the set-up for providing a biologically-safe water system for agricultural irrigation use includes: 1). A source of irrigation water. 2). A chlorine source. 3). A control set-up for continuous feeding of the chlorine source to meet, and usually exceed, the chlorine demand of the irrigation water. 4). An analytical set-up for monitoring chlorine residual levels at the target outer (preferably farthest) field point (and preferably also at various points in the block that is being irrigated and treated with a chlorine source). 5). A control set-up for regulating the chlorine feed rate based on the chlorine residual data obtained from the field. The control set-ups may be embodied in a single apparatus and the analytical set-up may be embodied in a single mobile analytical station.

Source of Irrigation Water

The most common sources of agricultural irrigation water are reservoirs, lakes, ponds, canals, streams, rivers, wells, and water recycled from other uses, and combinations thereof. All of these sources have their own particular biological contaminants and levels of contamination. The present method requires, and the present system permits, the level of contamination to be identified, and the level of chlorination treatment quantified and targeted thereto.

Chlorine Source

As mentioned above, there are three principal sources of chlorine that might be considered for the chlorination of irrigation water in an agricultural environment, namely chlorine gas, sodium hypochlorite, and calcium hypochlorite.

The use of chlorine gas, although very economical, poses a severe safety risk, namely the possibility of a deadly release of the poisonous chlorine gas if the containment tank ruptures or containment is otherwise breached. This safety risk has eliminated the use of chlorine gas for agricultural chlorination purposes in almost all but the most remote locations. Many areas of the U.S. have banned its use.

Sodium hypochlorite (as an aqueous solution of sodium hypochlorite) is readily available and, in comparison to chlorine gas, is much safer to use. A prime drawback to the use of sodium hypochlorite is that it is only available in concentrations between 6 percent (household bleach) and 12.5 percent (industrial bleach). The sodium hypochlorite solution is so dilute that its shipping costs (essentially the cost of shipping water) are, or at least approach being, prohibitive. In addition, large storage tanks are required to provide enough chlorine solution for ongoing treatment of an irrigation system. Another problem with the addition of sodium hypochlorite to irrigation water is the sodium, which is undesirable for some crops.

Calcium hypochlorite is also readily available and much safer to use. It is commercially available as a solid which typically contains 67 percent available chlorine. Its high-chlorine solid form is much easier and less costly to transport, and to store, than the dilute sodium hypochlorite solution. Delivery of the solid calcium hypochlorite into the irrigation system is easily accomplished using the chlorinator for feeding saturated calcium hypochlorite to flowing water which is described in U.S. Pat. No. 6,238,573, issued May 29, 2001, Miller et al., the content of which is hereby incorporated hereinto by reference.

Total chlorine is a measure of free and combined chlorine. In other words, total chlorine, as the term is used herein and as understood generally in the chlorination technical field, is the combination of free chlorine and combined chlorine. Free chlorine in aqueous media is present as a pH-dependent equilibrium between hypochlorous acid (HOCl) and hypochlorite ion (OCl$^-$). The relative percentages of hypochlorous acid and hypochlorite ion vary with water pH. Hypochlorous acid predominates at low pH. Combined chlorine (chloramines) is chlorine combined with ammonia or organic nitrogen.

Free chlorine forms when solid calcium hypochlorite is added to water by the following reactions:

$$2\ Ca(OCl)_2 + H_2O \rightarrow 2\ Ca^{+2} + 4\ OCl^- + H_2O$$

$$4\ OCl^- + H_2O \rightarrow Cl_2 + 2\ Cl^- + 2\ OH^-$$

$$Cl_2 + H_2O \rightarrow HOCl + H^+ + Cl^-$$

Although calcium hypochlorite is the preferred chlorine source, any of the above chlorine sources can be used in this invention.

Determination of the Chlorine Demand

The chlorine demand of a water source is the ceiling amount of chlorine that is consumed, in a specific volume of water, over a specific time interval, and is normally measured by the addition of an excess of chlorine to the water source. In the method of the present invention, the chlorine demand of the irrigation water is determined by an initial test conducted analytically. The determined chlorine demand is the prime gauge of the level of chlorine that a continuous chlorine delivery system must supply for sufficiently full chlorination disinfection. The chlorine-demand determination is an integral part of the methodology of the preferred embodiments of the present invention, which is discussed further below.

It is noted here for clarity that biological contamination is usually not responsible for the entirety of the determined chlorine demand. Chlorine is an oxidizing chemical and it is not selective only for biological species. Other materials, including inorganic materials such as iron, manganese and sulfides, will also consume chlorine when these species are present in their lower oxidation states in water sources. In other words, in order to provide sufficient chlorine for water disinfection, the present method considers all of the sources of chlorine consumption in the incoming irrigation water and, in the preferred embodiments, measures them collectively by the chlorine demand determination.

The present method in preferred embodiments does not solely rely on the determined chlorine demand, or more precisely does not solely rely on meeting the determined chlorine demand with the level of chlorine fed to the water, to assure sufficient chlorination disinfection system wide, and instead augments the chlorine feed level and monitors the actual chlorine residual levels reached at the target outer (preferably farthest) field point, as discussed in more detail elsewhere herein.

Ready Adaptation and Implementation at Diverse Irrigation-System Configurations

There are countless irrigation-system configurations in the field. Irrigation control systems are normally sized and custom-designed for each particular ranch or farm that is being irrigated. Although grower sites, and the irrigation systems assembled thereon, vary considerably from one ranch to the next, the present method and system can be readily and successfully adapted to, and implemented at, each site. In other words, despite the extensive diversity among irrigation-system configurations, the method of the present invention provides a standard or universal disinfection system that delivers chlorine to each configuration at a rate that achieves effective chlorination disinfection without the hazards of over chlorination. The chlorination level (the target chlorine feed level) is preferably determined by the chlorine demand of the incoming irrigation water, plus the selected target chlorine residual at an outer field point, preferably the farthest field point, irrespective of the irrigation-system configuration. Then chlorine is delivered to the irrigation water at a rate proportional to both the target chlorine feed level and the flow rate of the water so that a chlorine residual of the selected target level is realized, and sufficiently uniformly maintained, at the target outer (preferably farthest) field point, again irrespective of the irrigation-system configuration.

Analytical Monitoring in the Field for Chlorine

Monitoring for residual chlorine in the field, which at minimum is done at the target outer (preferably farthest) field point, and preferably is also done at various points in the irrigation system, is a key component to insuring that a low, but measurable, level of available chlorine is continuously maintained throughout the entire irrigation system. If depletion of the chlorine residual occurs ahead (upstream) of the farthest field point, whereby no chlorine residual is detected at the farthest field point, a failure to achieve system-wide disinfection of the irrigation water system must be presumed because there is no practical technique for determining whether or not the chlorine residual depletion occurred just immediately ahead of the farthest field point or farther upstream. On the other hand, the detection of chlorine residuals at the farthest field point reassures that system-wide disinfection of the irrigation water system has been achieved. The same would be substantially true if an outer field point was used that is reasonably comparable to, but not exactly, the farthest field point, which is discussed further below. (A chlorine depletion which is seen at an upstream monitoring point, if any, would confirm a failure to achieve system-wide disinfection of the irrigation water system.)

The level of water disinfection via a chlorination treatment is a function of chlorine concentration (C) and the contact time of the chlorine (T) with the microorganisms. Many irrigation systems have long runs (lengths) of main and lateral pipes in which, in any given bit of water, the amount of time for the contact of the chlorine is high. As mentioned above, the present method sets a target chlorine feed level and looks to the chlorine residual in the irrigation water at the target outer (preferably farthest) field point as the indicator or marker confirming the sufficiency of the target chlorine feed level. Residual chlorine levels of about 0.4 ppm free chlorine and/or total chlorine at the target outer point in the field have been determined, and are considered, to be threshold or universal in the present invention (although the invention in embodiments is not limited thereto) because such chlorine residuals are generally satisfactory to ensure effective disinfection of the irrigation water in the typical long irrigation system runs, as determined by testing for the presence of the target organism(s). However, each irrigation system is unique, and the residual chlorine level required for realizing effective water treatment (disinfection), or required for realizing the grower's desired degree of water treatment, may be determined in preferred embodiments of the invention for each situation by also testing for the presence, and the level of, the target organism(s) at the target outer field point. Further, in some situations, higher, or lower, levels of residual chlorine may be required or acceptable for adequate control of microbiologicals while at least controlling, if not minimizing, chlorine consumption, as discussed in more detail below.

Farthest, Outermost and Target Outer Field Points

By the term "farthest field point" as used herein is meant the point along the irrigation pipeline network in the field which is farthest away in the sense of time, that is, the amount of time which elapses between water (a) passing the point of entry to the field and (b) reaching the given point. An irrigation pipeline network is typically branched out into a plurality of blocks (sections) each servicing a portion of a field. Each block has an outermost point which is the farthest in pipe-line distance that is reached by the irrigation water, as measured from the point the irrigation water enters the field. This is the outermost block point. Each block of a multi-block field has an outermost block point. The outermost block point which is also the greatest in pipeline length from the point of entry of irrigation water to the field is the outermost field point. Although the outermost field point is typically the farthest field point, this is not always true. The time required for water to reach a given point is dependent not only on pipeline length but also on the rate of water flow, and water flow rates can, and not uncommonly do, differ from block to block. For instance, if the outermost field point is in block X, and if block Y's outermost block point has a sufficiently long pipeline length and a sufficiently slower water flow rate, block Y's outermost block point might be the farthest field point. In addition, the present invention in broad embodiments is not limited to methods in which the farthest field point, or even the outermost field point, is meticulously determined because such exactitude is often impractical. Instead it is normally sufficient if one selects a target outer field point based on rough observations and/or measurements and/or measurements that appears to be the farthest field point, or a point reasonably comparable to the farthest field point. Further, it would be unwarranted to define herein the target outer field point so narrowly that it permits deliberate avoidance of the present invention (while reaping its benefits) by means of selecting a point reasonably comparable to, but not at, the farthest or outermost field point. Therefore the "outer field point" determined or selected may be the farthest field point, the outermost field point or a point reasonably comparable to either.

Control of the Chlorine Source Based on the Farthest Field Point Analytical Data Depending on the chlorine residual data obtained by the analytical monitoring in the field, the chlorine delivery might be adjusted so that the chlorine residual at the farthest field point is at a high enough level to sufficiently kill or inactivate the microbiological species contained in the water of the irrigation system. As will be more evident below, if sufficient chlorine residuals are seen at the farthest point in the irrigation system (farthest field point), then the rest of the irrigation system must be at a residual chlorine level somewhere between that of the chlorine source addition level (which is the highest) and the chlorine residual level of the water at the farthest field point (which is the lowest). In other words, the chlorine in the water reaching the farthest point has had the greatest contact time (T) with the microorganisms, and therefore the residual chlorine level at that point is the lowest residual chlorine level in the system. In the method of the present invention, continuous addition of a chlorine source at the level determined by the chlorine residual level at the farthest point in the irrigation system will substantially insure effective chlorination disinfection of the water in the entire irrigation system, controlling any microbiological concerns.

Many irrigation systems, especially those that utilize surface water sources such as reservoirs, ponds, lakes, canals, streams, rivers or recycled waters, contain microbiological contamination, such as *E. coli, Shigella, Salmonella, Campylobacter*, and *Giardia*. These microbiological contaminants may cause serious health problems if they are present in the water used in growing crops. It is the object of the present invention to reduce to acceptable standards the microbiological contamination found in many irrigation waters used to grow crops. If the human-toxigenic components of the irrigation waters are eliminated, then there is no potential for any serious health risks arising from the irrigation waters used in crop production.

To eliminate the potentially-harmful microbiological organisms in irrigation water, the steps which are followed for the agricultural irrigation system to be treated can be described as: 1). Determine the chlorine demand of the irrigation water being used. 2). If not already in place, install a chlorine source at or ahead of the point of entry of the irrigation water to the field (the runs of main and lateral pipes in the field). 3). If not already in place, install a variable chlorine delivery system for feeding the chlorine source at or ahead of the point of entry of the water to the field. 4). Calibrate the chlorine delivery system rate based on the determined chlorine demand of the irrigation water, the selected target chlorine residual and the water flow rate. 5). Turn on the irrigation system. The chlorine source and delivery system will automatically begin delivering the requisite level of chlorine based on the water flow rate, the chlorine demand and the target chlorine residual. 6). Monitor the residual chlorine at the target outer (preferably farthest) point in the field. The initial target level of residual chlorine (as free chlorine and/or total chlorine) at the target outer (preferably farthest) point in the field is a level or range sufficient for purposes of the present invention (discussed below). 7). Depending on the actual residual chlorine value at the target outer (preferably farthest) point in the field, either make no chlorine-output adjustment or instead increase or decrease the output of the chlorine delivery system until the target residual chlorine level at the target outer (preferably farthest) point in the field is observed.

The efficacy of the present invention is illustrated in Examples 1 and 2. These Examples exemplify typical implementations of the method of the present invention and typical systems of the present invention. In each Example, the chlorine demand of the irrigation water was determined by adding the equivalent of 10 ppm of chlorine to a sample of the irrigation water of interest (referred to therein as Sample A). This water/chlorine sample was then sealed and agitated (stirred) for 30 minutes at ambient temperature. After such processing, the sample (referred to therein as Sample B) was analyzed for free chlorine and total chlorine. The preliminary chlorine demand ("pcd") was then determined by the difference between the initial 10 ppm level of added chlorine in Sample A and the level of residual chlorine in Sample B. This determination of chlorine demand was, but need not have been, conducted off-site in Examples 1 and 2. The chlorine demand of the irrigation water is the least amount of chlorine to be added when the goal is complete irrigation-water-source disinfection, which goal requires that a sufficient amount of chlorine is available in the irrigation water to completely disinfect the water by killing and/or inactivating the microbiological organisms which originate from the source of irrigation water. The amount of chlorine required to be added to reach this goal ranges from about pcd to about (pcd+x), wherein pcd is again the preliminary chlorine demand of the irrigation water and x is zero or a positive numeral (numeric figure, not limited to integers). Therefore the amount of chlorine required to be added to reach a complete irrigation-water-source disinfection goal cannot be lower than the chlorine demand of the incoming irrigation water, and usually is higher than that so as to provide detectable chlorine residuals.

The chlorine demand of the incoming irrigation water is preferably analytically determined, for instance as described above, but an empirical approach is not excluded from broad embodiments of the invention. Such an empirical approach might entail feeding chlorine while making incremental adjustments to the chlorine feed rate until the selected target chlorine residual is seen at the selected outer field point. Such an approach identifies empirically the chlorine feed rate that provides the target chlorine residual at the selected outer field point. The empirically determined chlorine feed rate inherently must exceed the chlorine demand of the incoming irrigation water even though that preliminary chlorine demand has not itself been quantified analytically. Therefore an empirical approach such as this does not quantify the chlorine demand and possibly does not calibrate the chlorine delivery system based upon a quantified target chlorine feed rate and quantified rate of flow of water through the point of entry.

Both free chlorine residual and total chlorine residual are determined at various points in the following Examples 1 and 2, although measuring only one or the other is sufficient and within the scope of the present invention.

Example 1

The method of the present invention was carried out at a ranch that was experiencing microbiological problems in agricultural production. Referring to FIG. 1, there is shown a schematic illustration of an irrigation system of the present invention, which is designated by the general reference number 10, as put into service on this ranch by enhancement of the existing irrigation system. The irrigation system 10 provides irrigation water to the grower's field 12, shown in phantom in FIG. 1. Upstream of the field 12 is a source of irrigation water (reservoir 20) and an irrigation pump 22 (irrigation pumping station) which pumps irrigation water from the water source 20 through the main line 32. The field 12 is comprised of three portions or blocks, namely a first block 14, a second block 16 and a third block 18, each of which is shown in phantom in FIG. 1. Each block is serviced by a lateral irrigation line, namely a first lateral line 40, a second lateral line 42 and a third lateral line 44. Irrigation water flow to each lateral line is controlled by a shut-off valve, namely a first shut-off valve 46, a second shut-off valve 48 and a third shut-off valve 50, each neighboring the intersection of the respective lateral line with the main irrigation line 32. Under normal operating conditions, only one of the shut-off valves 46, 48, 50 would be open, and only one of the blocks 14, 16, 18 would be undergoing irrigation, at any given time. Each block has a plurality of irrigation lines 60 branching of the respective lateral line and stretching out along the crops (not shown) in the respective block. Each irrigation line 60 has a plurality of irrigation delivery points (not shown) at which irrigation water is delivered to the crops. At the intersection of each irrigation line 60 and the respective lateral line from which it stems is a riser 62. Each riser 62 is a small shut-off valve permitting the halting of water flow to its respective irrigation line 60 without curtailing water flow to the remaining irrigation lines 60 in the respective block.

Each block has an outermost block point, namely a first outermost block point 52, a second outermost block point 54 and a third outermost block point 56 in respectively the first block 14, the second block 16 and the third block 18. The outermost block points 52, 54, 56 are the points in the irrigation pipe system in each respective block that are the most distant longitudinally (pipe length) from the irrigation water's point of entry to the field 58, which here was measured from the irrigation pump 22. (In this system 10, measuring from the irrigation pump 22 is a convenient equivalent to measuring from the point of entry of water to the field, discussed further below.) The outer block point 56 of the third block 18 is the most distant point longitudinally (pipe length) in the irrigation system 10 in the field 12, again in the sense of longitudinal length of the irrigation pipe serving the field 12 from the irrigation pump 22. That outermost block point 56 is therefore also the outermost field point, which in this Example 1 was also determined to be the farthest field point and the outer field point.

In this system, the outermost or farthest points, whether block points or the farthest field point, can be measured from the irrigation pump 22 or at the point of entry to the field 58, which may be any point along the main line 32 upstream of, or right at, the first branching of the main line 32, which usually is, as here, the first branching of a lateral line, here lateral line 40. Each of these points, being (or being directly upstream of) the literal point of entry of the water to the field 58', without any branching off the main line 32, is a sufficient reference for establishing the point in the irrigation pipeline network in the field which is farthest from the point of entry of the water to the field. The chosen point for the measurement is a matter of practicalities, and is referred to herein at times as the measuring point. A tangible, stationary fixture, such as the irrigation pump 22, is a particularly convenient measuring point.

The irrigation water was tested upstream of the multi-block field 12 at the then-future site of chlorine injection, namely a chlorine delivery system 26, for (a) coliform bacteria and (b) total bacteria, and was found to contain (a) a coliform bacteria level of 234 colonies/100 ml. and (b) a total bacteria level of >300 colonies/ml. This coliform bacteria level could exceed this particular grower's standard, namely the acceptable *E. coli* level for recreational water use, which is currently set at 126 colonies/100 ml. The grower felt that this bacterial level in the incoming irrigation water created an unacceptable risk of contaminating its sprinkler-irrigated leafy greens with toxigenic strains of *E. coli* from the irrigation water. The irrigation water source was a surface reservoir 20. The flow rate of irrigation water from the reservoir 20 through the irrigation system 10 varied between 600 and 1200 gal./min., depending on which portion or block of the field 12 was under irrigation. The chlorine demand of the irrigation water upstream of the field 12 was tested and found to be 1.7 ppm chlorine.

The chlorine source for the method and system implementation described here in this Example 1 was calcium hypochlorite. The chlorine injection or delivery system 26, which was installed after the irrigation water tests noted above, consisted of a positive displacement (feed) pump 28 connected to the calcium hypochlorite source equipment 30, which was in turn connected directly to the irrigation water main line system 32 downstream of the irrigation water pump 22. This positive displacement (feed) pump 28 and calcium hypochlorite source equipment 30 was as is described in U.S. Pat. No. 6,238,573, issued May 29, 2001, Miller et al., the content of which is hereby incorporated hereinto by reference. A flow meter 24, which was installed on the irrigation water main line 32, monitored the water flow rate and sent feedback signals to the positive displacement pump 28, so that the pump 28 was always feeding chlorine proportional to the flow rate of water.

A 2.1 ppm chlorine addition rate target was set. This 2.1 ppm chlorine addition-rate target corresponded to the chlorine demand (1.7 ppm free chlorine and 1.7 ppm total chlorine) plus the selected target chlorine residual (0.4 ppm free chlorine and 0.4 ppm total chlorine) at the farthest point in the field 56. The positive displacement pump 28 therefore was set to feed calcium hypochlorite from the chlorine source 30 to the main irrigation water line 32 at the chlorine feed rate necessary to inject about 2.1 parts by weight chlorine for each million parts by weight of the passing irrigation water (a 2.1 ppm level). The chlorine feed rate thus is dependent on, and follows, the flow rate of the irrigation system, which initially was flowing to the third block 18, a block identified to have a flow rate of about 952 gal./min. Calibrating or regulating the chlorine delivery system 26 in this manner insures that when the irrigation water flow rate changes, for instance changes to 1200 gal./min. when another portion or block of the field 12 is being irrigated, the water flow/chlorine pump feedback system of the chlorine delivery system 26 will automatically adjust the chlorine feed rate so as to continue feeding chlorine to the irrigation water to provide the 2.1 ppm chlorine addition rate.

As noted above, the irrigation system 10 was initially configured to irrigate the third block 18. The third block 18 is the block that is farthest from the irrigation pump 24, and the farthest point in the field was identified as the outermost block point 56 of this third block 18. System configuration is determined by the open/closed condition of the shut-off valves 46, 48, 50. The irrigation system 10 was configured to irrigate the third block 18 by having the third shut-off valve 50 open to allow water flow to the third lateral line 44, and having the first and second shut-off valves 46, 48 closed to preclude water flow to the first and second lateral lines 40, 42 of respectively the first and second blocks 14, 16.

In this Example 1, in addition to the step of analyzing the irrigation water at the farthest field point 56 for residual chlorine (here, both free chlorine and total chlorine), the basic present method was augmented by the steps of analyzing the irrigation water: (a) at the chlorine injection point, that is, where the chlorine delivery system 26 feeds chlorine to the main line 32; (b) at the first or upstream riser 62 of block being irrigated (the riser 62 closest to the respective shut-off valve for the respective block); and (c) when the system is configured to instead irrigate block 14 or 16 (instead of block 18) at the respective outermost block point. These analyses were conducted by using a mobile analytical station 64, which is shown positioned proximate the farthest field point 56 in FIG. 1. In addition, all water analyses included determinations of coliform bacteria and total bacteria counts in addition to both the free chlorine and the total chlorine levels.

The water samples for all three analyses reported for a given time period, which here was a given day, were taken sequentially (at the chlorine injection site, then at the upstream riser, then at the farthest field or block point), all within a timeframe of less than 25 minutes from the first to the last sampling, except on Day 1 when there was a two hour, eighteen minute time elapse between the riser and the farthest field point sampling. These series of tests were conducted, and are reported below, for Day 1s, at the start-up of the chlorine injection program, Day 1 (about seven hours after start-up), Day 4 (three days after start-up), Day 10 (nine days after start-up), and Day 23 (twenty-two days after start-up). Day 0 was the day before start-up. On Day 0 and Day 1s, the irrigation water was sampled and tested only at the chlorine injection site.

In this Example 1, the free chlorine and total chlorine residuals at the farthest field point 56, as measured on Day 1, were both 0.5 ppm. Thereafter, the chlorine residual there and at the outermost block points 52, 54, as measured on Day 4 through Day 23, varied between 0.4 ppm to 0.5 ppm. Since a 0.1 ppm free chlorine and/or total chlorine residual excess (over the target 0.4 ppm) was not excessive, even when detected at the farthest field point, no adjustment was needed, nor made, to the chlorine feed rate, which remained calibrated to a target chlorine level feed of 2.1 ppm and was determined to fluctuate between 2.0 to 2.1 ppm.

The data generated during this Example 1 implementation of the method of the present invention is set forth in Table 1 below, wherein test results for multiple sequential sampling points are presented in the sequence taken, which here is always in the order of chlorine injection point/upstream riser/farthest field and/or block point. (The farthest field point of a multi-block field cannot be sampled when blocks other than the one it is in are under irrigation because there is no irrigation water flowing to it.) The abbreviation ac-ft used below means acre-foot (325,851 gallons). The flow rates, as mentioned above, are particular to specific blocks in the field 12, which is the normal experience as discussed in general below.

TABLE 1

|  | Day 0 | Day 1s | Day 1 | Day 4 | Day 10 | Day 22 |
| --- | --- | --- | --- | --- | --- | --- |
| Water Usage (ac-ft) | N/A | 0 | 1.237 | 4.653 | 7.899 | 10.921 |
| Total Water Usage (ac-ft) | N/A | 0 | 1.237 | 5.890 | 13.789 | 24.710 |
| Water Flow Rate (gal/min) | 945 | 952 | 955-960 | 697 | 1050 | 922 |
| Block Under Irrigation | Third | Third | Third | First | Second | Third |
| Target $Cl_2$ feed level | None | 2.1 | 2.1 | 2.1 | 2.1 | 2.1 |
| Average $Cl_2$ feed level | N/A | 2.1 | 2.0 | 2.0 | 2.0 | 2.0 |
| Residual Chlorine, Free (ppm) | | | | | | |
| At $Cl_2$ injection | N/A | 1.6 | 1.6 | 1.7 | 1.6 | 1.5 |
| At upstream riser | N/A | N/A | 0.8 | 0.9 | 0.8 | 0.9 |
| At farthest x point | N/A | N/A | 0.4 | 0.5 | 0.5 | 0.4 |
| x point type | N/A | N/A | field | block | block | field |

TABLE 1-continued

|  | Day 0 | Day 1s | Day 1 | Day 4 | Day 10 | Day 22 |
|---|---|---|---|---|---|---|
| Residual Chlorine, Total (ppm) | | | | | | |
| At Cl₂ injection | N/A | 1.7 | 1.8 | 1.7 | 1.7 | 1.5 |
| At upstream riser | N/A | N/A | 0.9 | 1.0 | 1.0 | 0.9 |
| At farthest x point | N/A | N/A | 0.5 | 0.5 | 0.4 | 0.5 |
| x point type | N/A | N/A | field | block | block | field |
| Coliform Bacteria (colonies/100 ml) | | | | | | |
| At Cl₂ injection | 243 | 3 | 0 | 0 | 0 | 0 |
| At upstream riser | — | — | 1 | 0 | 1 | 0 |
| At farthest x point | — | — | 0 | 0 | 0 | 0 |
| x point type | N/A | N/A | field | block | block | field |
| Total Bacteria (colonies/ml) | | | | | | |
| At Cl₂ injection | >300 | 21 | 0 | 2 | 1 | 3 |
| At upstream riser | — | — | 0 | 0 | 3 | 0 |
| At farthest x point | — | — | 0 | 3 | 0 | 0 |
| x point type | N/A | N/A | field | block | block | field |

As seen in Table 1, the target level of chlorine feed to the main line 32 was 2.1 ppm, and the chlorine injection system 26 was seen to continue the delivery of chlorine at a rate to provide an initial chlorine level of 2.1±0.1 ppm regardless of the water-flow rate seen on the different monitoring days, and regardless of the volume of water through the system 10 since chlorine feeding began, which volume had reached almost 25 total acre-feet level at the time of Day-22 monitoring. The target of 0.4 ppm free chlorine and total chlorine residual at the farthest field point, or a slightly higher 0.5 ppm level, was seen at that point on days the third block 18 was being irrigated, namely Day 1 and Day 22, and the same level was seen at the outermost block points 52, 54 of respectively the first and second blocks 14, 16 which were irrigated and monitored on Day 4 and Day 10 respectively. In addition, monitorings upstream of the farthest field/block points confirm that the levels of free chlorine and total chlorine residual were consistently maintained at the farthest-point-target level and higher throughout the active sections of irrigation system (sections of pipeline through which irrigation water was flowing). The chlorine residuals seen at the upstream risers, just as the irrigation water starts to enter the various irrigation lines 60 of the blocks, ranged from about 0.8 to about 1.0 ppm. The effectiveness of the present method and system in providing a sufficient chlorine residual across the active sections of the irrigation system, as seen in Table 1 and discussed immediately above, translates to effective microbial disinfecting of the irrigation water system-wide, far surpassing this grower's standards. The coliform levels detected across active irrigation sections (from the upstream risers to the farthest field/block points), regardless of which block was being irrigated, and regardless of how far away the block was from the chlorine injection point, were typically zero, and no more than 1 colony/100 ml. The total bacteria levels detected, on the same basis, were also typically zero, and no more than 3 colonies/ml. Uniform system-wide irrigation water disinfection was achieved without the risks of excessive chlorine being delivered to the agricultural product.

Example 2

Figure 2:
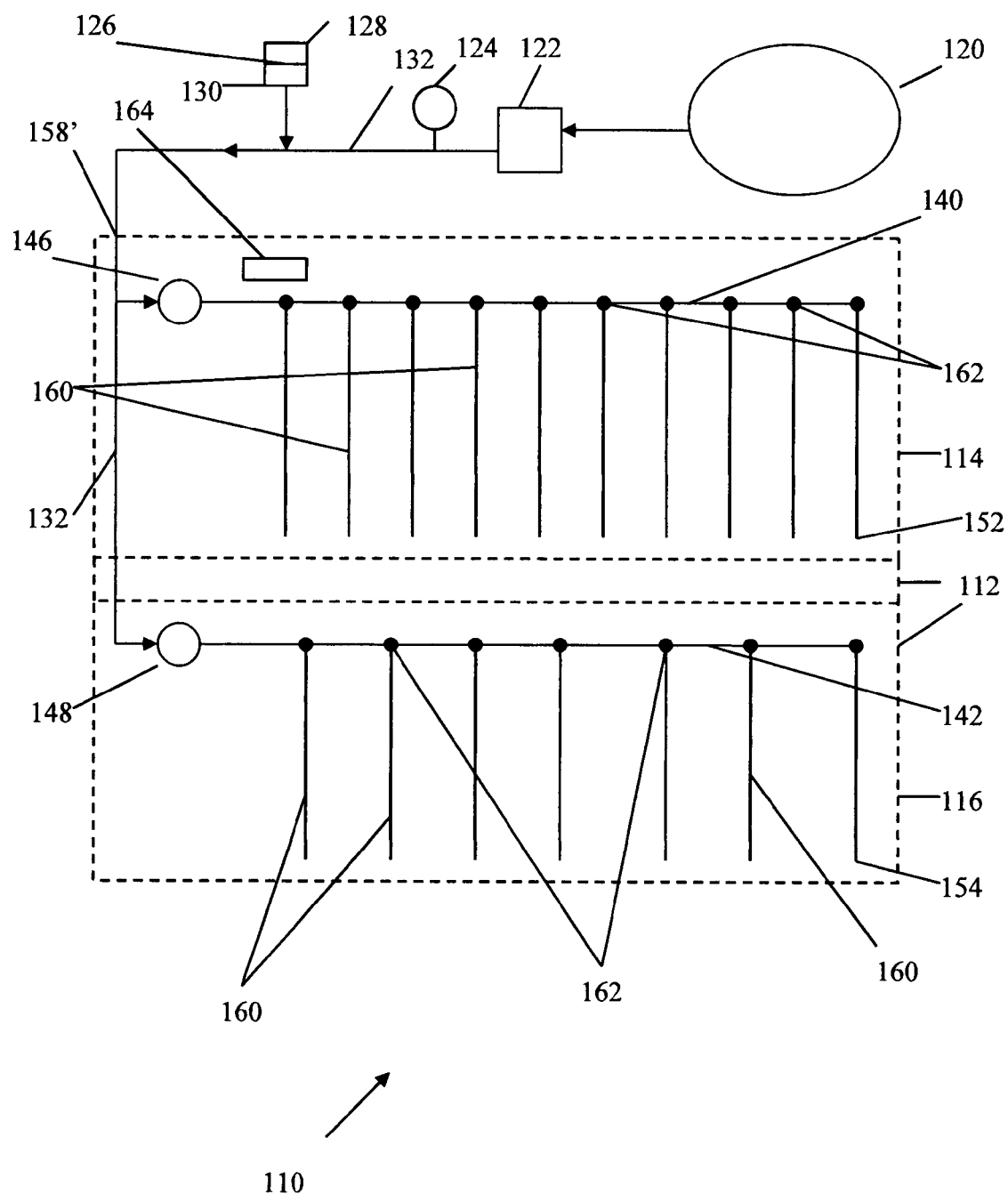
FIG. 2 is a schematic drawing of an irrigation system of the present invention.

The method of the present invention was carried out at another ranch that was experiencing microbiological contamination of its agricultural irrigation water. Referring to FIG. 2, there is shown a schematic illustration of an irrigation system of the present invention, designated by the general reference number 110, which was put into service on this ranch by enhancement of the existing irrigation system. The irrigation system 110 provides irrigation water to the grower's field 112 (shown in phantom in FIG. 2). Upstream of the field 112 is a source of irrigation water (reservoir 120) and an irrigation pump 122 (irrigation pumping station) which pumps irrigation water from the reservoir 120 through the main line 132. This field 112 is comprised of two portions or blocks, namely a first block 114 and a second block 116. Only one of the blocks 114, 116 would be under irrigation at any given time. Each block is serviced by a lateral irrigation line, namely a first lateral line 140 servicing the first block 114 and a second lateral line 142 servicing the second block 116. Irrigation water flow to each lateral line is controlled by a shut-off valve, namely a first shutoff valve 146 and a second shut-off valve 148, each neighboring the intersection of the respective lateral line with the main irrigation line 132. Each block has a plurality of irrigation lines 160 branching of the respective lateral line and stretching out along the crops (not shown) in the respective block. Each irrigation line 160 has a plurality of irrigation delivery points (not shown) at which irrigation water is delivered to the crops. At the intersection of each irrigation line 160 and the respective lateral line from which it stems is a riser 162. Each riser 162 is a small shut-off valve permitting the halting of water flow to its respective irrigation line 160 without curtailing water flow to the remaining irrigation lines 160 in the respective block. Each block has a outermost block point, namely a first outermost block point 152 and a second outermost block point 154 in respectively the first block 114 and the second block 116. The outermost block points 152, 154 are the points that are the most remote longitudinally (pipe length) from the irrigation pump 122 in the irrigation pipe system in each respective block. It was determined that the outermost block point 154 of the second block 116 is the most distant point longitudinally (pipe length) in the irrigation system 110 in the field 112, again in the sense of longitudinal length of the irrigation pipe serving the field 112 from the literal point of water entry to the field 158', as measured from the irrigation pump 122. That outermost block point 154 was therefore also the outermost field point, which in this Example 2 was also the farthest field point and the outer field point.

The microbiological contamination problems in this irrigation system 110 were far worse than the system 10 described in Example 1 above. The irrigation water being used was tested for coliform bacteria and found to be at a level of 934 colonies/100 ml. This farmer wanted an *E. coli* level of <1 colony/100 ml. at the delivery point (sprinkler head) to ensure a safe level for the irrigated agricultural production. The irrigation water source was a very large reservoir 120 near hills. The hills were used for cattle grazing, which made this reservoir 120 particularly susceptible to microbiological contamination. The reservoir 120 had large populations of ducks and geese and was susceptible to run-off during rainy periods. The flow rate of irrigation water from the reservoir 120 through the irrigation system 110 varied between 1000 and 1300 gal./min, depending on which portion or block of the field 112 was under irrigation. The chlorine demand of the irrigation water upstream of the field 112 was tested and found to be 2.6 ppm chlorine (both free chlorine and total chlorine).

The chlorine source for this Example 2 was calcium hypochlorite. A chlorine delivery system 126 was installed downstream of the irrigation pump 122 and upstream of the field 112. The chlorine delivery system consisted of a positive displacement (chlorine feed) pump 128 connected to the calcium hypochlorite source equipment 130, which was in turn connected directly to the irrigation water main line 132. This positive displacement (feed) pump 128 and calcium hypochlorite source equipment 130 was as is described in U.S. Pat. No. 6,238,573, issued May 29, 2001, Miller et al., the content of which is hereby incorporated hereinto by reference. A flow meter 124, mounted into the irrigation water main line 132, monitored water flow rate and sent feedback signals to the positive displacement pump 128 for feeding chlorine proportional to the flow rate of water as described in Example 1 above.

Chlorine residual levels of 0.4 free chlorine and total chlorine were initially selected as the target at the farthest field point. The positive displacement pump 128 was calibrated or regulated to feed chlorine from the calcium hypochlorite source equipment 130 at a rate of 3.0 parts of chlorine per million parts of irrigation water flowing past the chlorine injection site in the main irrigation line 132. This 3.0 ppm chlorine level addition-rate target corresponded to the determined chlorine demand (2.6 ppm chlorine) plus the selected target chlorine residual (0.4 ppm free chlorine and total chlorine) at the farthest field point, namely the outermost block point 154 in the second block 116. Block 116 was identified to have a flow rate of 1223 gal./min.

As noted above, the irrigation system 110 was configured to irrigate the second block 116 in which, again, the farthest point in the field 112, namely the outermost block point 154, had been identified. System configuration is determined by the open/closed condition of the shut-off valves 146, 148. The irrigation system 110 was configured to irrigate the second block 116 by having the second shut-off valve 148 open to allow water flow to the second lateral line 142, and having the first shut-off valve 146 closed to preclude water flow to the first lateral line 140 of the first block 114.

In this Example 2, in addition to the step of analyzing the irrigation water at the farthest field point 154 for residual chlorine (here, both free chlorine and total chlorine), the basic present method was augmented by the steps of analyzing the irrigation water: (a) at the chlorine injection point, that is, where the chlorine delivery system 126 feeds chlorine to the main line 132; (b) at the first or upstream riser 162 of block being irrigated (the riser 162 closest the respective shut-off valve for the respective block); and (c) when the system is configured to instead irrigate block 114 (instead of block 116) at the respective outermost block point. In addition, all water analyses included determinations of coliform bacteria and total bacteria counts in addition to both the free chlorine and the total chlorine levels, and were conducted using a mobile analytical station 164 shown in FIG. 2 positioned proximate the upstream riser 162 in the first block 114.

As discussed further below, the initial feeding of chlorine to the irrigation system 110 (configured for the second block 116) at a target feed level of 3.0 ppm chlorine did not provide the 0.4 ppm farthest-field-point chlorine residual target nor did it achieve satisfactory disinfection. Accordingly, a shock-treatment step was undertaken whereby the chlorine feed to the irrigation system 110 was raised to a higher level to clean or remove microbiological contaminants built up inside of the irrigation system 110, which in irrigation systems generally may include irrigation-water filters, irrigation mains, lateral distribution systems, and irrigation-water delivery devices. When the internal biological loading deposits were decomposed by the chlorine and flushed from the irrigation system 110, the chlorination level being delivered from the chlorine delivery system 126 source was adjusted back to the initial 3.0 ppm chlorine.

As seen below in the data in Tables 2 and 3, feeding the chlorine at a level of 3.0 ppm based solely on the determined chlorine demand of 2.6 ppm for the incoming irrigation water source plus the target of 0.4 ppm chlorine residual at the farthest field point, for approximately 5 hours (at Day 1s2) did not realize the target 0.4 ppm residual chlorine, and left a significant amount of coliform and total bacteria, at the farthest point in the field. The existence of an irrigation-system chlorine demand higher than the incoming irrigation-water chlorine demand, such as that detected here, is a sign of a "dirty" system, i.e., one which has biological material adhering to its various internal surfaces, such as the filters, mains, laterals and delivery devices. To clean the irrigation system 110, the chlorine addition rate was increased to 4.0 ppm for approximately 6 hours until the 0.4 ppm chlorine residual was obtained in the water at block point 154, the farthest point in the field 112, by virtue of this shock treatment (at Day 1s4). In this Example 2, the 0.4 ppm chlorine residual level was overshot by the shock treatment during a monitoring interval. Upon becoming aware that the chlorine residual level at the farthest point in the field 112 had been reached (and as noted, here exceeded during a monitoring interval) the shock treatment's 4.0 ppm chlorine feed level was lowered back to the maintenance 3.0 ppm chlorine feed rate.

The water samples for all three analyses reported for a given time period were taken sequentially (at the chlorine injection site, then at the upstream riser, then at the farthest field point or outermost block point), all within a timeframe of less than 25 minutes from the first to the last sampling, and typically less than 10 or 15 minutes. These series of tests were conducted, and are reported below, for Day 1s1, at the start-up of the chlorine injection program, Day 1s2 (about four hours after start-up), Day 1s3 and 1s4 (during the shock treatment on the day of the start-up), Day 3 (two days after start-up), Day 11 (ten days after start-up) and Day 18 (seventeen days after start-up). In this Example 2, during the shock treatment, the total chlorine residual at the farthest field point 154 overshot the 0.4 ppm target level, reaching 0.8 ppm. Thereafter, the free chlorine and total chlorine residuals at the outermost block points, as measured on Day 3 through Day 18, varied between 0.5 ppm to 0.6 ppm. Since this excess of 0.1 or 0.2 ppm chlorine residual (over 0.4 ppm) was not undue, particularly when seen at a outermost block point (here, block point 152), rather than a farthest field point, the target chlorine feed rate was held at 3.0 ppm, and was determined to fluctuate between 2.9 to 3.1 ppm.

The data generated during this Example 2 implementation of the method of the present invention is set forth in Tables 2 and 3 below, wherein test results for multiple sequential sampling sites are presented in the sequence taken, which here is always in the order of chlorine injection point/upstream riser/farthest field or outermost block point. The abbreviation ac-ft used below means acre-foot (325,851 gallons). The flow rates are, as mentioned above, particular to specific blocks in the field 112.

fection was achieved, as seen in the Day 1s4 data. The chlorine feed was then returned to the 3.0 ppm level, and the smooth operation of the system continued, which is shown by Day 3 monitoring (about forty-eight hours after the Day 1s4 monitoring). The long term success of the method of the present invention is seen in the later monitorings of Day 11 and Day 18, which are set forth below in Table 3 together with the Day 0 monitoring results for reference.

TABLE 2

Start-Up Through Shock Treatment End

|  | Day 0 | Day 1s1 | Day 1s2 | Day 1s3 | Day 1s4 | Day 3 |
|---|---|---|---|---|---|---|
| Water Usage (ac-ft) | N/A | 0 | 0.901 | 0.453 | 1.020 | 4.342 |
| Total Water Usage (ac-ft) | N/A | 0 | 0.901 | 0.354 | 2.374 | 6.716 |
| Water Flow Rate (gal/min) | 1206 | 1223 | 1228 | 1230 | 1232 | 1190 |
| Block Under Irrigation | Second | Second | Second | Second | Second | Second |
| Target Cl Feed Rate (ppm) | None | 3.0 | 3.0 | 4.0 | 4.0 | 3.0 |
| Average Cl Feed Rate (ppm) | N/A | 3.0 | 3.0 | 3.9 | 3.9 | 2.9 |
| *Residual Chlorine, Free (ppm)* | | | | | | |
| At Chlorine injection | N/A | 0.9 | 1.6 | 2.2 | 2.4 | 1.0 |
| At upstream riser | N/A | N/A | 0.8 | 1.2 | 1.8 | 0.9 |
| At farthest x point | N/A | N/A | 0.0 | 0.0 | 0.4 | 0.3 |
| x point type | N/A | N/A | field | field | field | field |
| *Residual Chlorine, Total (ppm)* | | | | | | |
| At Chlorine injection | N/A | 1.4 | 2.0 | 2.5 | 2.5 | 1.2 |
| At upstream riser | N/A | N/A | 1.0 | 1.6 | 2.0 | 1.0 |
| At farthest x point | N/A | N/A | 0.1 | 0.3 | 0.8 | 0.5 |
| x point type | N/A | N/A | field | field | field | field |
| *Coliform (colonies/100 ml)* | | | | | | |
| At Chlorine injection | 943 | 60 | 0 | 0 | 0 | 0 |
| At upstream riser | N/A | N/A | 1 | 0 | 0 | 0 |
| At farthest x point | N/A | N/A | 401 | 5 | 0 | 0 |
| x point type | N/A | N/A | field | field | field | field |
| *Total Bacteria (colonies/ml)* | | | | | | |
| At Chlorine injection | >300 | 23 | 0 | 0 | 0 | 0 |
| At upstream riser | N/A | N/A | 0 | 0 | 0 | 0 |
| At farthest x point | N/A | N/A | >300 | 40 | 0 | 3 |
| x point type | N/A | N/A | Field | field | field | field |

As see in Table 2 above, which spans the shock treatment stage of Day 1s3 and Day 1s4 monitorings (about six and eleven hours after start-up respectively), the Day 1s2 monitoring (about four hours after start-up) indicated that the system was not providing free chlorine and total chlorine residuals of 0.4 ppm at the farthest point of the field. Instead there was no free chlorine residual detected, and only 0.1 ppm total chlorine residual detected, at the farthest field point, although chlorine residuals in excess of 0.4 ppm were seen upstream of the farthest field point. A shortfall in farthest field point residual chlorine such as this in the present process is a sign of disinfection deficiencies, which was confirmed by the coliform count of 401 colonies/100 ml. and total bacteria count of >300 colonies/ml. at the farthest field point. The far lower bacteria counts upstream of the farthest field point corroborated the conclusion that the bacteria counts derived from contamination of internal system surfaces rather than 1 contamination solely from the incoming irrigation water, as discussed above. During shock chlorination treatment, the 0.4 ppm free chlorine residual target was reached and the 0.4 ppm total chlorine residual target over-shot, and sufficient disin-

TABLE 3

Prior to Start-Up versus Continued Operational Success

|  | Day 0 | Day 11 | Day 18 |
|---|---|---|---|
| Water Usage (ac-ft) | N/A | 6.569 | 6.11 |
| Total Water Usage (ac-ft) | N/A | 13.285 | 19.396 |
| Water Flow Rate (gal/min) | 1206 | 1104 | 1216 |
| Block Under Irrigation | N/A | First | Second |
| Target Chlorine Feed Rate | None | 3.0 | 3.0 |
| Average Chlorine Feed Rate | N/A | 3.1 | 3.0 |
| *Residual Chlorine, Free (ppm)* | | | |
| At Chlorine injection | N/A | 1.0 | 1.1 |
| At upstream riser | N/A | 0.8 | 0.9 |
| At farthest x point | N/A | 0.5 | 0.4 |
| x point type | N/A | block | field |
| *Residual Chlorine, Total (ppm)* | | | |
| At Chlorine injection | N/A | 1.4 | 1.3 |
| At upstream riser | N/A | 1.0 | 1.0 |
| At farthest x point | N/A | 0.6 | 0.5 |
| x point type | N/A | block | field |

TABLE 3-continued

Prior to Start-Up versus Continued Operational Success

|  | Day 0 | Day 11 | Day 18 |
| --- | --- | --- | --- |
| Coliform Bacteria (colonies/100 ml) | | | |
| At Chlorine injection | 943 | 0 | 0 |
| At upstream riser | N/A | 2 | 1 |
| At farthest x point | N/A | 0 | 0 |
| x point type | N/A | block | field |
| Total Bacteria (colonies/ml) | | | |
| At Chlorine injection | >300 | 0 | 0 |
| At upstream riser | N/A | 0 | 0 |
| At farthest x point | N/A | 0 | 0 |
| x point type | N/A | block | field |

As seen in Table 3 above, the system and method of the present invention have been confirmed to provide sufficient disinfection along the entire length of an irrigation system when the farthest field point chlorine residual is maintained at about 0.4 ppm. Further as seen in Table 3, when blocks other than the farthest-field-point block are being irrigated, such as the first block 114 of field 110, the chlorine residual at the outermost point in that block (here, at block point 152) will be at least 0.4 ppm. No adjustment of the chlorine feed to the irrigation system is required when the system is re-configured to irrigate different blocks (portions) of the field.

Further regarding Example 2 above, when the threshold level of approximately 0.4 ppm free chlorine and/or total chlorine is realized at the farthest point in the irrigation field, microbiological contamination of the irrigation water in the system, particularly as it exits irrigation delivery points, is eliminated. If the internal surfaces of an irrigation system require cleaning, this condition will be detected by an initial failure to reach a 0.4 ppm chlorine residual in the irrigation water at the farthest point in the field despite a chlorine feed rate based on the chlorine demand of the incoming irrigation water plus an additional 0.4 ppm chlorine. When such a need to clean contaminants from internal surfaces is detected, the chlorine feed is raised and held at a raised level until the 0.4 ppm chlorine residual in the irrigation water at the farthest point in the field is obtained. Then the chlorine feed is reset to the chlorine demand of the incoming irrigation water from the irrigation water source plus the additional 0.4 ppm chlorine or other target chlorine residual.

When an irrigation system is being treated by continuously feeding chlorine in the manner prescribed in the method of this invention, any change of the chlorine demand of the incoming irrigation water source is detected by a concomitant change in the chlorine residual in the water at the outer (preferably farthest) field point in the irrigation system. An incoming-water chlorine-demand decrease will be seen as an increase in the chlorine residual in the water at the outer field point. An incoming-water chlorine-demand increase will be seen as a decrease in the chlorine residual in the water at the outer field point. The chlorine source feed rate may then be adjusted up or down appropriately. Maintaining for instance a threshold 0.4 ppm chlorine residual at the end of the irrigation system (the outer field point) assures that the entire irrigation system, and the irrigation water delivered to the crop, is essentially free from microbiological contamination. Although higher levels of chlorine would certainly be effective, and probably more effective, for microbiological control, the threshold level of approximately 0.4 ppm residual chlorine provides the necessary level of control of the microbiologicals while maintaining the best economics for the grower.

As seen from the implementations of the present method for the diverse irrigation systems described in Examples 1 and 2 above, the target of about 0.4 ppm chlorine residual at the outer (preferably farthest) field point, regardless of whether it is free chlorine or total chlorine, or a dual target of 0.4 ppm free chlorine and 0.4 ppm total chlorine, is a very functional threshold or universal target. When chlorine is fed to an irrigation system in accordance with the present method, i.e., based on a target chlorine residual at the outer field point plus the chlorine demand of the irrigation water upstream of the field, and the target chlorine residual is seen at the outer field point, the microbial contamination of the irrigation water throughout the irrigation system is essentially eradicated, particularly if the target chlorine residual is 0.4 ppm free chlorine and/or total chlorine. In instances of a dirty system, for instance as seen at Day1s2 of Example 2, when little to no chlorine residual is seen at the farthest field point, despite the feeding of chlorine based on the chlorine demand of the incoming irrigation water plus a measurable target of chlorine residual, a substantial microbial contamination is entering the irrigation water someplace along the pipeline network. Since a drop in the total chlorine residual, and apparent complete depletion of free chlorine residual, occurred between the upstream riser 162 and the farthest field point 154, and bacteria counts shot up from negligible to substantial in the same lateral-line span, it must be presumed that contaminated irrigation water was being delivered to the crops at least at some delivery points in the second block 116. This is a special, but not unheard of, contamination issue that is detected, and cured, via embodiments of the present method.

A chlorine-residual target at the outer (preferably farthest) field point which is within the range of from about 0.3 to about 0.6 ppm free chlorine and/or total chlorine is believed sufficiently close to the 0.4 ppm threshold or universal target to provide an effective degree of irrigation-water disinfection throughout the irrigation system without consumption of an overly excessive amount of chlorine and without delivering an undue amount of chlorine to the crops undergoing irrigation. Regarding the latter issue (undue chlorine delivery to crops), it is for instance seen at Day 1s4 of Example 2 that when chlorine residuals of 0.4 ppm free chlorine and 0.8 ppm total chlorine were seen at the farthest field point 154, chlorine residuals of 1.8 ppm free chlorine and 2.0 ppm total chlorine were seen at the upstream riser 162. Since the active irrigation delivery points at Day 1s4 were those along the irrigation lines 160 branching off the lateral line 142 between that upstream riser 162 and farthest field point 154, the level of chlorine delivered to the crops was no more than, and presumably rather less than, 1.8 ppm free chlorine and 2.0 ppm total chlorine. Such moderate levels of chlorine in the irrigation water as delivered to crops are believed to be well within the safe level range.

The method and system of the present invention do not, however, in broad embodiments exclude the selection of target chlorine residuals at the outer (preferably farthest) field point that are outside of, and even well outside of, the range of from about 0.3 to about 0.6 ppm free chlorine and/or total chlorine. For instance, using the Day 1s2 conditions of Example 2 for reference, chlorine residuals of 0.0 ppm free chlorine and 0.1 ppm total chlorine were seen together with coliform bacteria counts of 401 colonies/100 ml at the farthest field point. While coliform bacteria counts at the level of 401 colonies/100 ml would be intolerable to many growers, on a relative basis there was a highly significant drop in the contamination level for that irrigation system. The untreated irrigation water itself had coliform bacteria counts more than twice as high, and the dirty internal surfaces of the irrigation system 110 could well have raised the actual contamination level of the water delivered to the crops even higher. Therefore an irrigation system will benefit from the implementation of the present invention and system using target chlorine residuals at the outer field point that are as low as 0.1 ppm total chlorine, even in the absence of detectable free chlorine at that point, although a detectable free chlorine residual of 0.1 ppm would be of more benefit in the present method and system. Further, a detectable chlorine residual, particularly if it is a detectable free chlorine residual, realized at the outer field point, is sufficient to provide the benefits of the present invention. A detectable level of chlorine residuals, whether free chlorine or total chlorine, is now 0.1 ppm when using current conventional analysis techniques suitable for use in the field, although the present invention is not limited to 0.1 ppm chlorine residual as the lowest detectable level.

In addition, the method and system of the present invention do not, in broad embodiments, exclude the selection of target chlorine residuals at the outer (preferably farthest) field point that are higher than 0.6 ppm free chlorine and/or total chlorine. Although higher chlorine residuals are not believed necessary for near complete irrigation-water disinfection, and although the chlorine-source costs will possibly increase without a concomitant performance-increase benefit, such a method and system would remain effective as to the goal of establishing a system in which microbial disinfection is realized throughout the irrigation system, regardless of which block or portion of the field is under irrigation.

The method of the present invention, as seen in the above Examples 1 and 2, in preferred embodiments may include the steps of determining the level(s) of one or more microbiological species at the outer (preferably farthest) field point and/or at one or more points upstream thereof. The method of the present invention, as seen in the above Examples 1 and 2, in preferred embodiments also may include the steps of determining the chlorine residual level(s) at one or more points upstream of the outer (preferably farthest) field point.

Example 3

Figure 3:
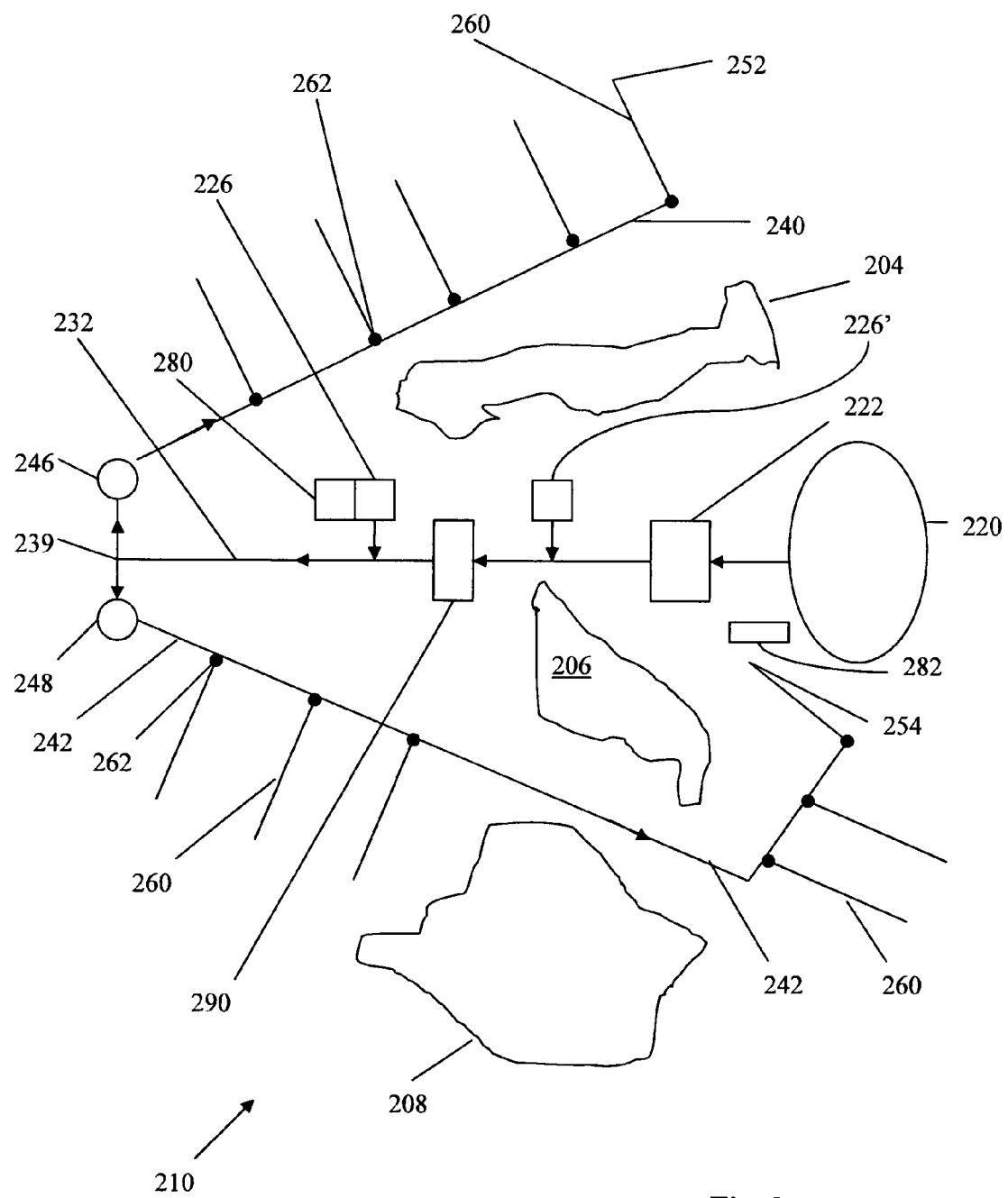
FIG. 3 is a schematic drawing of an irrigation system of the present invention.

Referring to FIG. 3, there is shown a schematic illustration of an exemplifying agricultural irrigation system of the present invention, which is designated by the general reference number 210. The irrigation system 210 provides irrigation water to the field under cultivation laid out among hills 204, 206, 208 which themselves are not under cultivation. The source of irrigation water 220 is flanked by hills 204, 206. Irrigation water is drawn from the irrigation water source 220 by a plurality of pumps (not shown) of an irrigation pumping station 222 into a main line 232. The main line 232 branches into two lateral lines, namely the first lateral line 240 and the second lateral line 242. Irrigation water flows to the first and second lateral lines 240, 242 are controlled respectively by the first and second shut-off valves 246, 248, each neighboring the intersection 239 of the lateral lines 240, 242 with the main irrigation line 232. Each lateral line has a plurality of irrigation lines 260 branching off and stretching out along the crops (not shown). Each irrigation line 260 has a plurality of irrigation delivery points (not shown) at which irrigation water is delivered to the crops. At the intersection of each irrigation line 260 and the respective lateral line from which it stems is a riser 262 (small shut-off valve) permitting the halting of water flow to its respective irrigation line 260. Off of each lateral line is an outermost block point, namely a first outermost block point 252 of the first lateral line 240 and a second outermost block point 254 off of the second lateral line 242. The outermost block points 252, 254 are the points along or off each lateral line (for instance as here at the end of an irrigation line 260) that are the most remote longitudinally (pipe length) from the point of, or upstream of, the branching of the main line 232 at intersection 239. The outermost block point 254 of the second lateral line 242 is the outermost point out longitudinally (pipe length) in the irrigation system 210, again in the sense of longitudinal length of the irrigation pipe from intersection 239 or upstream thereof, and is also the farthest field point, although "as the crow flies" it is the closest point to the irrigation source 220. A chlorine delivery system 226 is installed downstream of the irrigation pump 222, and downstream of a filter 290 which filters solid debris out of the irrigation water flowing through the main water line 232. Also shown in FIG. 3 is an alternatively placed chlorine delivery system 226' which is positioned upstream of the filter 290. The chlorine demand measurement at chlorine delivery system 226' would include the chlorine-demand contribution of the solid debris being filtered out of the irrigation water downstream at the filter 290, and therefore sufficient chlorine would be fed to the main line 232 for the purpose of the present invention despite the chlorine consumption of the solid debris removed at the filter 290. Only one chlorine delivery system, either system 226 or system 226', would normally be installed and used.

Also depicted diagrammatically in the system shown in FIG. 3 is a first analytical station 280 adapted for determining the chlorine demand of the water upstream of the point of irrigation water entry to the field and a second analytical station 282 adapted for determining the chlorine residual level of the irrigation water at the farthest field point.

Some but not all irrigation systems have more than a single pump operating at its irrigation pumping station. Therefore the terminology of irrigation pumping station as used herein, and as understood generally in the agricultural irrigation field, includes not only single-pump but also multi-pump pumping stations.

Nearly all irrigation systems will experience flow-rate differentials, depending on to which block the irrigation water is flowing. This phenomena normally reflects (is consequential to) differences between blocks, which differences include the size (in acres or other area units) of the blocks, the type and number of active irrigation water delivery-point devices within the blocks, as well as the elevation of the blocks, and in some instances the water pressure of the system. In the instances of irrigation systems having no flow-rate differential of any significance beyond the on/off conditions (zero flow rate when the water-flow system is off, and a single, substantially consistent or constant flow rate when the water-flow system is on), there is no need to continuously track the flow rate with a flow meter or the like. Instead, simpler means for determining the flow rate past the chlorine delivery system (when the water-flow system is on) can be used prior to calibrating the variable chlorine delivery system. For instance, the flow rate often can be determined using a simple timer, and the on/off variation of flow rate can be determined using a pressure sensor or flow sensor. The variable chlorine delivery system controls may also be simpler than the controls which automatically respond to operational water-flow rate differentials, because their variable characteristics need not surpass that required for the calibration based on the determined (and substantially constant) water flow rate and target chlorine residual. The selection, installation and operation of flow-rate meters or substitutes, and other equipment needed for implementing the method of the present invention, are well within the skill of a person of ordinary skill in the technical field, and all of such equipment is also commercially available at viable cost.

Some but not all irrigation systems have one or more filters between the source of irrigation water and the water delivery points, and normally between the source of irrigation water and the field. Such filters remove debris, including small particles, from the irrigation water upstream of water delivery points. The filter-removed substances routinely include some bio-contamination and/or other materials which contribute to the chlorine demand seen when the chlorine demand of the incoming irrigation water is measured ahead (upstream) of the filter.

Irrigation water flow rates in multi-block fields normally differ from block to block. In other words, the irrigation water flow rate through a multi-block irrigation system depends on the block under irrigation at the time. This is a normal phenomenon and reflects (is consequential to) differences between blocks, which differences include without limitation the relative sizes (in acres or other unit area) of the blocks, the type and number of active irrigation water delivery-point devices within the blocks, as well as the elevation of the blocks, and in some instances the pressure of the system.

As seen from the above examples, the present method of chlorination water treatment of agricultural water, particularly of agricultural water for irrigation, includes continuous chlorination disinfection. Among the purposes of such disinfection are the sanitation of coliform and prevention of plugging from biofilms and algae in drip irrigation systems. Continuous chlorination at a dosage determined by the present method application is a preventive or maintenance mode of chlorination. Shock chlorination treatments are used for emergency situations in canals, reservoirs, and irrigation systems. Shock treatment at higher chlorination rate is used for extreme conditions, and is the remediation mode of chlorination.

The method of the present invention does not exclude associated water treatment to alleviate interferences with the disinfection chlorination process, such as those spawned by turbidity, high pH and the like. The method of the present invention also does not exclude associated water treatments reducing or eliminating chlorine-demanding non-biological organic and/or inorganic compounds (e.g. iron, manganese), such as the oxidation of iron and manganese in tanks or reservoirs prior to filtration and/or prior to downstream chlorine feeding, although the presence of excess chlorine-demanding compounds normally does not adversely impact the efficacy of the method of the present invention.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

We claim:

1. A method for disinfecting irrigation water in an agricultural irrigation system, said agricultural irrigation system having irrigation water, a pipeline network serving an agricultural-production field and a point of entry of irrigation water to said field, comprising the steps of:
    determining an outer field point along said pipeline network;
    providing a chlorine source;
    providing a variable chlorine delivery system;
    selecting a detectable target chlorine residual at said outer field point;
    before activating of said chlorine delivery system, determining the chlorine demand of said irrigation water upstream of said field;
    activating said chlorine delivery system whereby said chlorine source is continuously fed to said irrigation water upstream of said field;
    after said activating of said chlorine delivery system, determining the level of chlorine residual at said outer field point;
    combining said target chlorine residual and said chlorine demand to determine a target chlorine feed level; and
    calibrating said chlorine delivery system based on said target chlorine feed level and the rate of flow of said irrigation water at said point of entry of said irrigation water to said field.

2. A method for disinfecting irrigation water in an agricultural irrigation system, said agricultural irrigation system having irrigation water, a pipeline network serving an agricultural-production field and a point of entry of irrigation water to said field, comprising the steps of:
    determining an outer field point along said pipeline network;
    providing a chlorine source;
    providing a variable chlorine delivery system;
    selecting a detectable target chlorine residual at said outer field point;
    activating said chlorine delivery system whereby said chlorine source is continuously fed to said irrigation water upstream of said field;
    after said activating of said chlorine delivery system, determining the level of chlorine residual at said outer field point; and after said activating of said chlorine delivery system, determining the level of at least one microbiological specie in said irrigation water at said outer field point.

3. A method for disinfecting irrigation water in an agricultural irrigation system, said agricultural irrigation system having irrigation water, a pipeline network serving an agricultural-production field and a point of entry of irrigation water to said field, wherein said agricultural-production field further includes at least a first block, wherein said pipeline network further includes a main line having a first lateral line branching off said main line at a first intersection, servicing said first block, having a first outermost block point which is not said outer field point, wherein said first intersection is downstream of said chlorine injection point, comprising the steps of:
    determining an outer field point along said pipeline network;
    providing a chlorine source;
    providing a variable chlorine delivery system;
    selecting a detectable target chlorine residual at said outer field point;
    activating said chlorine delivery system whereby said chlorine source is continuously fed to said irrigation water upstream of said field;
    after said activating of said chlorine delivery system, determining the level of chlorine residual at said outer field point; and
    after said activating of said chlorine delivery system and determining the level of chlorine residual at said outer field point, at a time when said irrigation is flowing to block 1, determining the level of at least one microbiological specie at said first outermost block point.

4. A method for disinfecting irrigation water in an agricultural irrigation system, said agricultural irrigation system having irrigation water, a pipeline network serving an agricultural-production field and a point of entry of irrigation water to said field, wherein said field further includes at least a first block, wherein said pipeline network further includes a main line having a first lateral line branching off said main line at a first intersection, servicing said first block, having a first outermost block point which is not said outer field point, and having a first riser, wherein said first intersection is downstream of said chlorine injection point, comprising the steps of:
- determining an outer field point along said pipeline network;
- providing a chlorine source;
- providing a variable chlorine delivery system;
- selecting a detectable target chlorine residual at said outer field point;
- activating said chlorine delivery system whereby said chlorine source is continuously fed to said irrigation water upstream of said field;
- after said activating of said chlorine delivery system, determining the level of chlorine residual at said outer field point; and
- after said activating of said chlorine delivery system, at a time when said irrigation is flowing to block 1, determining the level of chlorine residual and at least one microbiological specie at said first outermost block point and determining the level of chlorine residual at said first riser.

5. A method for disinfecting irrigation water in an agricultural irrigation system, said agricultural irrigation system having irrigation water, a pipeline network serving an agricultural-production field and a point of entry of irrigation water to said field, wherein said field further includes at least a first block, wherein said pipeline network further includes a main line having a chlorine injection point, a first lateral line branching off said main line at a first intersection, servicing said first block and having a first outermost block point and a first riser, wherein said first intersection is downstream of said chlorine injection point, comprising the steps of:
- determining an outer field point along said pipeline network;
- providing a chlorine source;
- providing a variable chlorine delivery system;
- selecting a detectable target chlorine residual at said outer field point;
- activating said chlorine delivery system whereby said chlorine source is continuously fed to said irrigation water upstream of said field;
- after said activating of said chlorine delivery system, determining the level of chlorine residual at said outer field point; and
- after said activating of said chlorine delivery system, when said irrigation is flowing to block 1, determining the level of chlorine residual at said first outermost block point, at said first riser and at said chlorine injection point.

\* \* \* \* \*